(12) United States Patent
Deeb et al.

(10) Patent No.: US 6,869,666 B2
(45) Date of Patent: Mar. 22, 2005

(54) CONTROLLED-PUNCTURE FILMS

(75) Inventors: Gerald Steven Deeb, Mendota Heights, MN (US); Douglas Adelbert Devens, Jr., Saint Paul, MN (US); Dennis Louis Krueger, Hudson, WI (US); Marcia Christine Nichols, Hutchinson, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 277 days.

(21) Appl. No.: 09/847,467

(22) Filed: May 2, 2001

(65) Prior Publication Data

US 2003/0022010 A1 Jan. 30, 2003

(51) Int. Cl.$^7$ ............................................. B32B 27/32
(52) U.S. Cl. ........................ 428/212; 428/515; 428/516; 428/523
(58) Field of Search ................................. 428/212, 217, 428/218, 516, 523, 515, 411.1

(56) References Cited

U.S. PATENT DOCUMENTS

| | | | |
|---|---|---|---|
| 3,321,125 A | 5/1967 | Quackenbush et al. | 229/55 |
| 3,553,804 A | 1/1971 | Kopsch et al. | 29/1.3 |
| 3,565,985 A | 2/1971 | Schrenk et al. | 264/171 |
| 3,647,612 A | 3/1972 | Schrenk et al. | 161/165 |
| 4,136,203 A | 1/1979 | Murphy et al. | 426/124 |
| 4,169,910 A | 10/1979 | Graboski | 428/35 |
| 4,210,686 A | 7/1980 | Gajewski et al. | 428/35 |
| 4,234,647 A | 11/1980 | Murphy et al. | 428/220 |

(List continued on next page.)

FOREIGN PATENT DOCUMENTS

| | | |
|---|---|---|
| AU | 8425267 A | 9/1984 |
| DE | 28 55 694 A1 | 7/1980 |
| DE | 44 14 669 A1 | 11/1995 |
| EP | 0 095 299 B1 | 9/1987 |
| EP | 0 169 640 | 1/1989 |
| EP | 0 163 251 B1 | 8/1989 |
| EP | 0 204 532 B1 | 8/1991 |
| EP | 0 328 055 B1 | 11/1992 |
| EP | 0 352 322 B1 | 9/1994 |
| EP | 0 500 590 B1 | 7/1995 |
| EP | 0 399 857 B1 | 8/1995 |
| EP | 0 567 125 B1 | 10/1996 |

(List continued on next page.)

OTHER PUBLICATIONS

ASTM Test Method D1709–03, Standard test method for Impact resistance of plastic film by free dart method (Equivalent to ISO 1988), 2003.*
CP Chem (HiD® 9662) Polyethylene Data Sheet (May 2000).*
U.S. Appl. No. 09/119,494, filed Jul. 20, 1998, entitled "Polymer Blends and Tapes Therefrom,".
Book Excerpt: S. Timoshenko and S. Woinowsky–Krieger, Theory of Plates and Shells, McGraw–Hill Book Company, Inc., 1959, pp. 4–7, 50–53.
Article: Tsou et al., "Stress Relaxation of Polymer Films in Bending," *Polymer*, vol. 36, No. 5, 1995, pp. 949–954.

Primary Examiner—D. Lawrence Tarazano
(74) Attorney, Agent, or Firm—Sean Edman (57) ABSTRACT

The present invention discloses methods of controlling the puncturability, and optionally the sealability (the ability of a film to conform around a puncturing object) and resealability (the ability of a film to close a hole made by a puncturing object), of polymeric films. Systems comprising a film and puncturing object are also disclosed. Puncturability is controlled by achieving targeted levels of the friction between the film and a puncturing object, the film's flexural rigidity, the film's recovering stress, and the film's elongation at break.

5 Claims, 1 Drawing Sheet

U.S. PATENT DOCUMENTS

| | | | |
|---|---|---|---|
| RE31,213 E | 4/1983 | Brachman | 428/462 |
| 4,514,465 A | 4/1985 | Schoenberg | 428/339 |
| 4,538,311 A | 9/1985 | Hall et al. | 5/451 |
| 4,540,623 A | 9/1985 | Im et al. | 428/220 |
| 4,551,380 A | 11/1985 | Schoenberg | 428/218 |
| 4,557,946 A | 12/1985 | Sacher et al. | 427/41 |
| 4,560,598 A | 12/1985 | Cowan | |
| 4,577,357 A | 3/1986 | Hall et al. | 5/451 |
| 4,577,816 A | 3/1986 | Foster | 244/148 |
| 4,581,524 A | 4/1986 | Hoekman et al. | 235/493 |
| 4,614,276 A | 9/1986 | Ihara et al. | 215/364 |
| 4,634,740 A | 1/1987 | Fujita et al. | 525/240 |
| 4,643,943 A | 2/1987 | Schoenberg | 428/339 |
| 4,650,710 A | 3/1987 | Harpell et al. | 428/263 |
| 4,678,754 A | 7/1987 | Hoskins | 436/15 |
| 4,692,496 A | 9/1987 | Bahl et al. | 525/240 |
| 4,781,957 A | 11/1988 | Brown et al. | 428/43 |
| 4,869,912 A | 9/1989 | McCoy et al. | 426/123 |
| 4,898,762 A | 2/1990 | Brown et al. | 428/152 |
| 4,908,278 A | 3/1990 | Bland et al. | 428/500 |
| 4,965,108 A | 10/1990 | Biel et al. | 428/35.7 |
| 4,979,611 A | 12/1990 | Bolliger et al. | 206/83 |
| 4,996,096 A | 2/1991 | Dew | 428/216 |
| 5,009,730 A | 4/1991 | Tozier | 156/85 |
| 5,026,778 A | 6/1991 | Fujii et al. | 525/210 |
| 5,027,801 A | 7/1991 | Grim | 128/80 H |
| 5,033,476 A | 7/1991 | Kasai | 128/764 |
| 5,071,686 A | 12/1991 | Genske et al. | 428/35.7 |
| 5,102,389 A | 4/1992 | Hauser | 604/93 |
| 5,212,001 A | 5/1993 | Brant et al. | 428/34.9 |
| 5,212,246 A | 5/1993 | Ogale | 525/240 |
| 5,254,612 A | 10/1993 | Sugi et al. | 524/274 |
| 5,268,220 A | 12/1993 | Tajima et al. | 428/220 |
| 5,292,560 A | 3/1994 | German | 428/34.9 |
| 5,314,746 A | 5/1994 | Johnson et al. | 428/338 |
| 5,328,705 A | 7/1994 | Wilhoit et al. | 426/113 |
| 5,360,868 A | 11/1994 | Mosier et al. | 525/89 |
| 5,389,448 A | 2/1995 | Schirmer et al. | 428/517 |
| 5,407,732 A | 4/1995 | Dokurno | 428/213 |
| 5,425,583 A | 6/1995 | Wild | 383/202 |
| 5,427,842 A | 6/1995 | Bland et al. | 428/213 |
| 5,453,466 A | 9/1995 | Pellegatti et al. | 525/240 |
| 5,460,861 A | 10/1995 | Vicik et al. | 428/34.9 |
| 5,468,807 A | 11/1995 | Tsurutani et al. | 525/240 |
| 5,478,891 A | 12/1995 | Lakshmanan et al. | 525/240 |
| 5,483,002 A | 1/1996 | Seelert et al. | 525/240 |
| 5,501,679 A | 3/1996 | Krueger et al. | 604/393 |
| 5,538,790 A | 7/1996 | Arvedson et al. | 428/349 |
| 5,539,056 A | 7/1996 | Yang et al. | 525/240 |
| 5,574,105 A | 11/1996 | Venkataswamy | 525/179 |
| 5,604,019 A | 2/1997 | Bland et al. | 428/212 |
| 5,614,297 A | 3/1997 | Velazquez | 428/218 |
| 5,667,902 A * | 9/1997 | Brew et al. | 429/518 |
| 5,677,029 A | 10/1997 | Prevorsek et al. | 428/113 |
| 5,691,034 A | 11/1997 | Krueger et al. | 428/152 |
| 5,713,141 A | 2/1998 | Mitchell et al. | 36/27 |
| 5,885,908 A | 3/1999 | Jaeger et al. | 442/59 |
| 6,110,570 A * | 8/2000 | Paleari et al. | 428/213 |
| 6,376,095 B1 * | 4/2002 | Cheung et al. | 428/516 |

FOREIGN PATENT DOCUMENTS

| | | |
|---|---|---|
| EP | 0 562 496 B1 | 5/1997 |
| FR | 2 564 780 A1 | 11/1985 |
| FR | 2 593 144 A1 | 7/1987 |
| GB | 2 012 672 A | 8/1979 |
| GB | 2 111 944 A | 7/1983 |
| GB | 2 154 178 A | 9/1985 |
| GB | 2 215 174 A | 9/1989 |
| GB | 2 296 005 A | 6/1996 |
| JP | 6 287541 | 10/1994 |
| JP | 8-20685 | 1/1995 |
| JP | 7-62154 | 3/1995 |
| JP | 8-333557 | 12/1996 |
| WO | WO 88/04154 | 6/1988 |
| WO | WO 91/07277 | 5/1991 |
| WO | WO 91/10565 | 7/1991 |
| WO | WO 94/28066 | 12/1994 |
| WO | WO 95/29202 | 11/1995 |
| WO | WO 97/27894 | 8/1997 |
| WO | WO 98/36903 | 8/1998 |
| WO | WP 99/51666 | 10/1999 |
| WO | WO 00/68336 | 11/2000 |

* cited by examiner

CONTROLLED-PUNCTURE FILMS

FIELD OF THE INVENTION

The present invention relates to polymeric films that can be made to be puncturable or puncture resistant, depending on the desired application. Also, certain of the polymeric films optionally can be made sealable and resealable, to varying degrees.

BACKGROUND

Different uses for films require different levels of puncturability. For example, for packaging applications, such as food packaging, a low level of puncturability is desired. For other applications, a high level of puncturability may be desired. Other uses may also require varying levels of film sealability (the ability of a film to conform around a puncturing object) and resealability (the ability of a film to reseal a hole made by a puncturing object).

SUMMARY

The present invention relates to a method of controlling puncturability of a polymeric film, whether it be to increase or decrease the ability of the film to be punctured (or to resist being punctured). The method optionally controls the sealability and resealability of a punctured polymeric film, whether it be to increase or decrease the ability of the puncture site to seal or reseal. The degree to which the film will puncture or not and, optionally, will seal or reseal or not is determined by at least one of flexural rigidity of the film, the elongation at break of the film, the recovering stress of the film and the friction between the film and a puncturing object.

In one embodiment of the present invention, a method of controlling puncturability of a polymeric film is provided. The method includes: providing a polymeric film; and modifying the film to provide a desired level of at least one of the flexural rigidity of the film, the elongation at break of the film, the recovering stress of the film, and the friction between the film and a puncturing object. Modifying the film can be accomplished by a number of methods. For example, it can include altering the modulus of the film by, e.g., changing the temperature of the film prior to, and during, penetration by a puncturing object; stretching and optionally releasing the film prior to penetration by a puncturing object; incorporating a modifying material into the bulk of the film that will migrate to the surface of the film; or applying a modifying material to the surface of the film as another layer. If the polymeric film is composed of at least two layers, modifying can also include changing one or both of the type of polymeric material or thickness of a surface layer that first contacts a puncturing object.

When modifying a film involves applying a modifying material to a surface of the film, the modifying material can be a variety of materials that have different coefficients of friction in relation to a puncturing object, such as a lubricant or an adhesive. Examples range from lubricants such as silicone oil that generally decrease the surface coefficient of friction to elastomeric materials, such as adhesives, that generally increase the surface coefficient of friction.

In another embodiment of the present invention, the polymeric film is a multilayer film of at least two layers. Modifying such a multilayer film can involve modifying at least one of the layers of the film to provide a targeted level of at least one of flexural rigidity of the film, the elongation at break of the film, the recovering stress of the film, and the friction between the film and a puncturing object.

In another embodiment of the present invention, there is provided a method of preparing a multilayer polymeric film having a targeted level of puncturability and optionally sealability and resealability of a puncture site. The method includes: (1) selecting a plastic material to form a first layer, (2) selecting an elastomeric material to form a second layer, and (3) joining the plastic material and the elastomeric material to form a multilayer polymeric film. The type and amount of materials forming the first layer and second layer can be selected to provide a targeted level of at least one of flexural rigidity of the film, the elongation at break of the film, the recovering stress of the film, and the friction between the film and a puncturing object.

The method can further include selecting a plastic material to form a third layer such that the first and third layers form outer layers, and the second layer forms a core layer of a three layer construction. Preferably, selecting a material for the core layer involves selecting an elastomeric material to provide a targeted level of the elongation at break of the film. The method can further include adding additional layers to a three layer construction.

The present invention also provides a multilayer polymeric film prepared by this method. In one embodiment, the film can be punctured when stretched to a given displacement by a puncturing object applied to a first major surface, but the film cannot be punctured when stretched to the same displacement by the same puncturing object applied to a second (opposing) major surface.

The present invention further provides another method of preparing a polymeric film having a targeted level of puncturability and optionally a targeted level of sealability and resealability of a puncture site. This method involves: selecting a polymeric material and a modifying material; combining the polymeric material and the modifying material to form a molten mixture; and forming the molten mixture into a film; wherein the types and amounts of polymeric and modifying materials are selected to provide a targeted level of at least one of flexural rigidity of the film, the elongation at break of the film, the recovering stress of the film, and the friction between the film and a puncturing object. The molten mixture may be either a miscible or immiscible blend of the two materials.

The present invention further provides a system for controlling the puncturability of a film by choosing a film with specific characteristics and properties and a puncturing object with specific characteristics and properties to obtain a desired level of puncturability.

As used herein, "elongation at break of the film" refers to the tensile strain at break as determined by ASTM standard D822.

As used herein, "film" refers to a flexible article having any shape that has two major surfaces, e.g., sheet or tube. Optionally the film has more than one layer. The film typically has a total thickness of no more than about 400 microns (0.016 inches), more typically no more than about 250 microns (0.01 inches) depending on the materials and construction used.

As used herein, "flexural rigidity of the film" refers to the product of the modulus of elasticity and moment of inertia of a film.

As used herein, "load" refers to the mechanical force that is applied to a body.

As used herein, "modulus of elasticity of the film" refers to the amount of force necessary to deform the film one strain unit.

As used herein, "moment of inertia of the film" refers to the geometric stiffness of the film (i.e., the cube of the thickness divided by 12).

As used herein "puncturability" refers to the displacement to break when the load of a probe is applied to a film.

As used herein, "resealability" refers to the ability of a film to reduce the size of a hole in the film at a puncture site up to the point of completely closing the puncture site. In embodiments where resealability is desired, preferably, a hole that is created in the film by a puncturing object reseals such that the circumference of the hole is less than 50% of the circumference of the puncturing object. More preferably, the hole will decrease to less than 20% of the circumference of the puncturing object.

As used herein, "sealability" refers to the ability of a film to form a seal around a puncturing object while it is puncturing the film.

As used herein, "recovering stress of the film" refers to the difference between the film's tensile stress at 300% elongation as determined by ASTM standard D822 and the stress when the film is returned to its original length after stretching to 300% elongation.

As used herein, "surface friction between the film and a puncturing object" refers to the linear coefficient expressing the tangential force to pull a sled covered with that film over a track consisting of the material of the puncturing object compared to the normal force (weight) of the sled. This is further discussed in the Examples Section.

DETAILED DESCRIPTION OF PREFERRED EMBODIMENTS

The present invention relates to polymeric films that can be controllably punctured and optionally sealed and/or resealed. Specifically, the present invention provides methods of controlling (i.e., adjusting) the puncturability (i.e., the ability of a film to be punctured or to resist being punctured), optionally the resealability (i.e., the ability of a film to reseal or to resist being resealed) of a puncture site, and optionally the sealability (i.e., the ability of the film to form a seal around a puncturing object) of a puncture site. Typically, these properties are determined by at least one of flexural rigidity of the film, the elongation at break of the film, the recovering stress of the film, and friction between the film and a puncturing object.

The methods of the present invention are advantageous because they allow for applications where it is desirable to reduce the puncturability of a film (i.e., increase the resistance to puncture) and for other applications where it is desirable to increase the puncturability of a film. The methods are advantageous because they allow for applications where it may also be desirable to increase the resealability of a puncture site of the film. In many applications, it is particularly advantageous to produce films that can be punctured and the puncture site resealed. Sealability of films around a puncturing object is also advantageous for applications where it is desirable to prevent materials from passing through the puncture site. For example, it may be desirable to prevent atmospheric contaminants from contacting a material kept under seal, or it may be desirable to prevent the sealed material from escaping into the atmosphere. This may be desirable where film puncturability is undesirable or in cases where film puncturability is desirable, but it is desirable to keep a material contained on one side of a polymeric film. For example, it may be desirable to keep a material under seal, but accessible via a syringe that can puncture the sealing film.

In one embodiment, control of puncturability can be accomplished by modifying a surface of the film to provide desired levels of flexural rigidity of the film, the elongation at break of the film, the recovering stress of the film, and surface friction between the film and the puncturing object. Modifying the surface can be accomplished by a number of methods. For example, it can include changing the modulus of the film by altering the temperature of the film prior to, and during, the penetration by a puncturing object; stretching and optionally releasing the film prior to penetration by a puncturing object; applying a modifying material to the surface of the film; or adding a modifying material to the bulk material comprising a film. For multi-layer films, modifying can also include changing the thickness of one or more layers or changing the properties of the surface layer that first contacts a puncturing object.

Another option is to modify the coefficient of friction between the puncturing object and the film (hereafter COF) to control the puncture resistance of the films. A puncturing object and flexible film generally interact as follows: as the puncturing object makes contact with the film, the film deforms in the direction of the puncturing object's motion. This is accompanied by local stretching of the film in the vicinity of the puncturing object's tip. As the film stretches, the elasticity of the film's materials requires the film construction to exert a hoop (compressive radially inward) stress on the puncturing object. This force is exerted nearly normal to the lateral surface of the puncturing object. Simultaneously, there is a tangential, or surface, force associated with driving the puncturing object downward and perpendicular to the force exerted by the hoop stress of the film.

If the COF is high (i.e., the puncturing object adheres to the film surface) the tangential stress associated with driving the puncturing object down into the film will not be great enough to overcome the normal force from the film hoop stress holding the film against the puncturing object (i.e., the product of the COF and the normal force is greater than the tangential force). Thus the puncturing object will pull the surrounding film downward with it such that the force exerted by the object will be distributed over the entire film surface in contact with the object. Because the film in contact with the puncturing object does not experience a stress large enough to cause mechanical failure, the portion of the film not in contact with the puncturing object will also be strained as the film in contact with the object is pulled with the movement of the puncturing object. This deformation of the non-contacting film will effectively distribute the load of the puncturing object so that mechanical failure will only be caused at much large displacements, i.e., large film deformations.

Conversely, if the COF is low, the tangential force from the puncturing object will overcome the normal force and the object will slip against the film surface. This will allow the load of the puncturing object to be concentrated entirely at its tip thus causing greater distortion of the film material underneath the object's tip until the object punctures (i.e., mechanically ruptures) the film. Thus, one may control the ease of puncture in flexible films by controlling the COF.

Additionally, changing the moment of inertia of a film can control puncture in films. A stiff film is more easily punctured than a flexible film. As has been explained, as a puncturing object makes contact with a film, the area immediately underneath the object undergoes distortion and stretching. This causes the film to exert a hoop stress inward to make contact (or conform around) the object. However this ability to make contact around the puncturing object depends on the ability of the film itself to conform to the object. For example, with a three-layered film of an elastomeric core layer and relatively rigid outer layers, as the film is stretched under the tip of the puncturing object, the elastomeric core layer exerts a force generated by the tendency of the film to recover from the hoop stress to drive the film toward contact with the object. If the outer layer is not rigid (due to small moment of inertia, or low modulus of elasticity of the film) in comparison to the core layer then the core layer material can drive the entire film to contact the puncturing object. However, if the outer layer is thick or stiff, then the core layer will be less able to force the entire film to conform to the puncturing object. The extent of the ability of the film to conform to the puncturing object also controls puncture resistance. If the film cannot conform to the puncturing object surface then the object will be able to concentrate its entire load immediately below its tip regardless of the COF. Conversely, if the film can conform to the puncturing object surface then puncture may be impeded, if the COF is sufficiently high.

When films having at least two layers are used, changing the recovering stress of the layer that is not first contacted by a puncturing object influences puncturability because it is this force that drives the contact of the surface of the film with the puncturing object. The surface of a material with a lower recovery stress will be less driven to contact the puncturing object, thereby allowing puncture to occur more easily. As illustrated by Example 11, the puncture resistance of some film constructions can be affected by the recovery stress of the film even when the elongation at break of each of the layers of the film is substantially unchanged.

Use of elastomeric layers can make controlled-puncture films of the invention resealable. Again, as was discussed in regard to puncture resistance, elastomeric films exert high hoop stresses, i.e., recovering forces from cylindrical deformation, (because they try to return to their original, unstressed state). It is this inward (toward the puncturing object) force that facilitates resealing. The tendency of less elastic films to generate the restoring force to reseal or recover strain in response to deformation is greatly reduced in comparison to elastomeric films.

It has been found (as is shown in Example (10)) that there is a correlation between ease of puncture and the ability of the film to reseal. If the film punctures easily, then only the perimeter of a relatively small area of the film (the area in contact with the tip of the puncturing object) is stretched to break. Depending on the size of the puncturing object, this can be a relatively small area and the resulting hole will be small. However, if the film is puncture-resistant, the ability of the film to conform to the puncturing object will be increased such that the area of the film in contact with the puncturing object will cover not only the object's tip but also at least some of the lateral surfaces of the object. Accordingly, the perimeter of the area that is stressed to break will include at least the portion of film in contact with the lateral surface of the object. Thus, for films with high COFs, the hole (the area within the broken perimeter) is relatively large and the film is less able to reseal the hole depending on the size and shape of the puncturing object. Thus, the resealability of holes in the films maybe controlled in tandem with (though not independent of) the puncture resistance of the films.

Elastomeric layers also contribute to the ability of a film to seal around a puncturing object. The elastic recovery of a film also allows the film to conform to the shape of the pucturing object. This sealability property is advantageous when it is desirable to keep elements on two different sides of a film from interacting while a film is being punctured. For example, sealability allows a film to be punctured without allowing contaminants or other materials to pass through the puncture site.

In one embodiment, the polymeric film is a multilayer film of two outer layers and at least one inner layer. Modifying such a multilayer film can involve modifying at least one of the outer layers of the film to provide a targeted level of at least one of flexural rigidity of the film, the elongation at break of the film, the recovering stress of the film, and the friction between the film and a puncturing object. For example, the thickness and/or stiffness of an outer layer can be changed to make an overall change in the thickness or stiffness of a film. Alternatively, modifying such a multilayer film can involve modifying an inner layer of the film to provide a targeted level of flexural rigidity of the film and elongation at break of the film.

In general, films having an $(AB)_nA$ (where n is greater than 1) construction can be more flexible than films of equal thickness having an ABA construction. This occurs, for example, when the A layer is a hard stiff material and the B material is a soft, pliable material. When a film is flexed the material at one surface is compressed and the material at the opposing surface is stretched. The material in the middle of the film is not significantly compressed or stretched. If the stiff material is at or near the film's surface and the soft material is near the film's center, stretching the film requires more force than if the stiff material were near the film's center and the soft material were at the surfaces.

However, in a film having, e.g., an ABABABA structure with the same relative amounts of A and B as an ABA film of equal thickness, some of the soft material has been moved out toward the surfaces where the stretching and compression occur during flexing, and some of the stiff material has been moved toward the center of the film where there is minimal stretching and compression. This structure makes it easier to bend the film because less of the stiff material needs to be stretched or compressed. Nevertheless, if you pull the film in tension (parallel to the layers) the stiffness of the film should be the same as for the ABA film because the same amount of A and B material is in cross section.

In one embodiment of the present invention, controlling the puncturability, and optionally sealability and resealability of a puncture site, of a polymeric film can be accomplished by producing a polymeric film having at least two layers wherein a first layer includes a plastic material and a second layer includes an elastomeric material. In this embodiment, the type and amount of materials of the first layer and second layer are selected to impart specified levels of flexural rigidity of the film, the elongation at break of the film, the recovering stress of the film, and friction between the film and a puncturing object.

In another embodiment, controlling the puncturability, and optionally the sealability and resealability of a puncture site, of a polymeric film can be accomplished by: selecting a polymeric material and a modifying material; combining the polymeric material and the modifying material to form a molten mixture; and forming the molten mixture into a film; wherein the type, and amount of polymeric and modifying materials are selected to provide a targeted level of at least one of flexural rigidity of the film, the elongation at break of the film, the recovering stress of the film, and the friction between the film and a puncturing object.

Whether it is applied to a surface of a polymeric film or mixed into the polymeric film, the modifying material can be a variety of materials able to change at least one of flexural rigidity of the film, the elongation at break of the film, the recovering stress of the film, or the friction between the film and puncturing object, such as a lubricant, an adhesive, or other monomers, oligomers, or polymers. Examples of modifying materials that can enhance puncturability include silicone oil and a wide variety of thermoplastic materials having a low COF relative to the puncturing object. For example, a high density polyethylene film would be an appropriate puncturable film if the puncturing object were a polypropylene needle. Examples of modifying materials that enhance puncture resistance are elastomers resulting in relatively high COFs such as, for example, tackified elastomers or self-tacky elastomers. The modifying material may be selected for its ability to slide against a specific puncturing object, thereby contributing to the resealability of the puncture site by causing a small diameter hole to be formed. The more puncturable a film is, the better it is able to reseal because the force and effect of the puncturing object is concentrated in a small area.

As mentioned above, the polymeric film can include one or more layers. For example, the polymeric film can include three layers—two outer layers and a core layer. In such a three-layer construction, the desired degree of puncture resistance and ability to seal and reseal can be affected by adjusting the properties of the film's core layers or at least one of the film's outer layers rigidity.

Plastic materials suitable for use in the present invention include those that are capable of being formed into a film layer, have a modulus of elasticity over $10^8$ Pa, and cannot sustain more than 20% strain without incurring permanent set (i.e., permanent deformation) at ambient temperature. Examples of suitable plastic materials include thermoplastics such as polyethylenes (high density, low density, and very low density), polypropylene, polymethylmethacrylate, polyethylene terephthalate, polyamides, and polystyrene; thermosets such as dyglycidyl esters of bisphenol A epoxy resins, bisphenol A dicyanate esters, orthophthalic unsaturated polyesters, bisphenol A vinyl esters.

Elastomeric materials suitable for use in the present invention can comprise any material that is capable of being formed into a thin film layer and exhibits elastomeric properties at ambient conditions. Elastomeric means that the material will substantially resume its original shape after being stretched. Further, preferably, the elastomer will sustain only small permanent set following deformation and relaxation which set is preferably less than 20% and preferably less than 10% at moderate elongation, e.g., about 400–500%. Generally any elastomer is acceptable which is capable of being stretched to a degree that causes relatively consistent permanent deformation in a plastic outer layer. This can be as low as 50% elongation. Preferably, however the elastomer is capable of undergoing up to 300 to 1200% elongation at room temperature, and most preferably 600 to 800% elongation at room temperature. The elastomer can be pure elastomer or blends with an elastomeric phase or content that will exhibit substantial elastomeric properties at room temperature.

Examples of suitable elastomeric materials include natural or synthetic rubbers block copolymers that are elastomeric, such as those known to those skilled in the art as A-B or A-B-A block copolymers. Such copolymers are described for example on U.S. Pat. Nos. 3,265,765; 3,562,356; 3,700,633; 4,116,917, and 4,156,673, the substance of which is incorporated herein by reference. Useful elastomeric compositions include, for example, styrene/isoprene/styrene (SIS) block copolymers, elastomeric polyurethanes, ethylene copolymers such as ethylene vinyl acetates, ethylene/propylene monomer copolymer elastomers or ethylene/propylene/diene terpolymer elastomers. Blends of these elastomers with each other or with modifying non-elastomers are also contemplated. For example, up to 50 weight %, but preferably less than 30 weight %, of polymers can be added as stiffening aids such as polyvinylstyrenes such as polyalphamethyl styrene, polyesters, epoxies, polyolefins, e.g., polyethylene or certain ethylene/vinyl acetates, preferably those of higher molecular weight, or coumarone-indene resin.

In a multi-layer film, the plastic layer can be an outer or inner layer (e.g., sandwiched between two elastomeric layers). In either case, it will modify the elastic properties of the multilayer film.

Recovery of a multilayer film after puncture will depend on a number of factors such as the nature of the elastomeric layer, the nature of the plastic layer, the manner in which the film is stretched, and the relative thickness of the elastomeric and plastic layers. Percent recovery (with no load is on the film) refers to stretched length minus the recovered length, the sum of which is divided by the original length.

Generally, the plastic layer will hinder the elastic force with a counteracting resisting force. A plastic outer layer will not stretch with an inner elastomeric layer after the film has been stretched (provided that the second stretching is less than the first); the plastic outer layer will just unfold into a rigid sheet. This reinforces the core layer, resisting or hindering the contraction of the elastomeric core layer.

For obtaining a more puncturable film, the friction between a puncturing object and the surface of the film should be reduced. A wide variety of mechanisms can be used to reduce this friction as long as there is a concentration of stress at the point of load applied by the object. This can include applying a modifying material to the film surface or selecting a different material for the outer surface of the film such that the coefficient of friction between the puncturing object and film surface is reduced. For example, a polypropylene/styrene-isoprene synthetic rubber/polypropylene multilayer film can be made more puncturable by a polypropylene tip if the film surface is sprayed with silicone oil.

Puncturability may be increased by stretching a film. Holding a film in a stretched position can make it more punctureable because it is less able to conform to the puncturing object.

In contrast, stretching and releasing a multilayer film comprising both elastomeric and plastic layers can decrease puncturability by decreasing the film's flexural rigidity. This can be done by stretching the multilayer film past the elastic limit of the plastic layer(s). Stretching and releasing can also lower a multilayer film's coefficient of friction and modulus of elasticity. In some embodiments, the plastic layer can function to permit controlled release or recovery of the stretched elastomeric layer, modify the modulus of elasticity of the multilayer film and/or stabilize the shape of the multilayer film.

The present invention provides polymeric films, including single films with a modified surface, having varying degrees of puncturability, and optionally varying degrees of sealability and resealability with regard to a specific type of puncturing object. In one embodiment, the film can be punctured when the film is stretched to a given displacement by a puncturing object applied to a first major surface, but the film cannot be punctured when the film is stretched to the same displacement by the same puncturing object applied to a second opposing major surface. For example a two-layer film having a low COF on the first major surface and a high COF on the second would be more easily punctured by a puncturing object through the first surface than through the second surface. Of course, the shape of the tip of a puncturing object can also affect the puncturability of the film.

The single layer films of the present invention may be made by extrusion methods or any other suitable methods known in the art.

The multilayer films of the present invention may be formed by any convenient layer forming process such as coating, lamination, coextruding layers or stepwise extrusion of layers, but coextrusion is preferred. Coextrusion per se is know and is described, for example, in U.S. Pat. Nos. 3,557,265 and 3,479,425. The layers are typically coextruded through a specialized feedblock or a specialized die that will bring the diverse materials into contact while forming the film.

Coextrusion may be carried out with multilayer feedblocks or dies, for example, a three-layer feedblock (fed to a die) or a three-layer die such as those made by Cloeren Co., Orange, Tex. A suitable feedblock is described in U.S. Pat. No. 4,152,387. Typically streams of materials flowing out of extruders at different viscosities are separately introduced into the feedblock and converge to form a film. A suitable die is described in U.S. Pat. No. 6,203,742.

The feedblock and die used are typically heated to facilitate polymer flow and layer adhesion. The temperature of the die depends on the polymers used. Whether the film is prepared by coating, lamination, sequential extrusion, coextrusion, or a combination thereof, the film formed and its layers will preferably have substantially uniform thicknesses across the film.

The present invention also provides systems of puncturable films and puncturing objects that can be tailored to each other to obtain a desired level of puncturability. For example, if a specific puncturing object is to be used, the properties and characteristics of a film can be made to complement the puncturing object to provide the desired level of ease of puncturability. The puncturing object may be made of a particular material, may have a particular shape (including the shape of its tip), etc. Knowing this information, the composition and structure of a film can be made to provide the appropriate flexural rigidity of the film, the elongation at break of the film, the recovering stress of the film, and friction between the film and puncturing object to provide the desired level of ease of puncturability of the film. Optionally, sealability and resealability of the film can be tailored in the same manner.

Conversely, if a given film is to be punctured, based on its composition, structure, flexural rigidity, elongation at break, and recovering stress, a puncturing object can be chosen based on its composition (which will affect the friction between the film and puncturing object), and its shape (including the shape of its tip), to provide the desired level of ease of puncturability of the film, and optionally sealability and resealability.

Specific examples of the methods of this invention as well as objects and advantages of this invention are further illustrated by the following examples, but the particular materials and amounts thereof recited in these examples, as well as other conditions and details, should not be construed to unduly limit this invention.

Test Methods

Puncture Resistance Test

Figure 1:
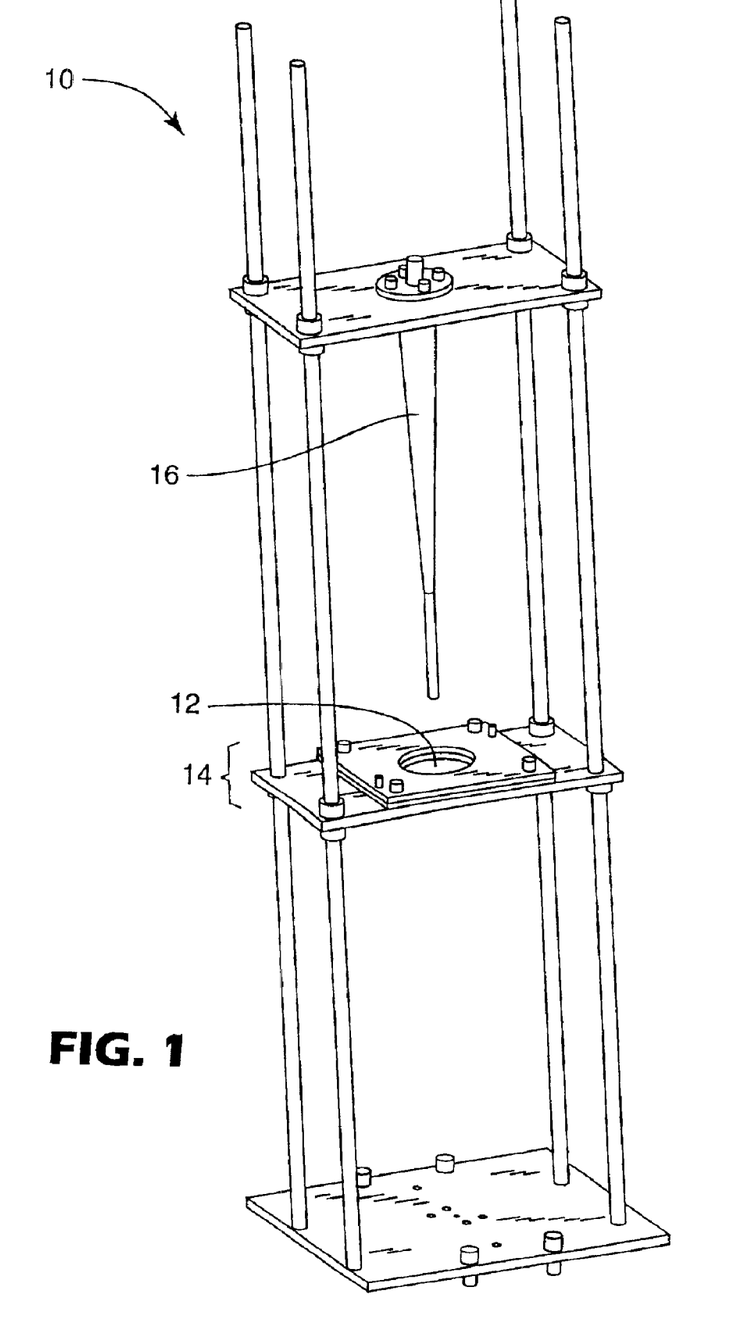
FIG. 1 is an illustration of an apparatus used to drive a puncturing object into a film and measure the film's flexure at rupture or break.

Film samples were tested for puncture resistance using two variations of ASTMD3763-97a in which apparatus 10 illustrated in FIG. 1 was used to drive a puncturing object into a film and measure the flexure at rupture or break. In Variation A, hole 12 in the center of clamp assembly 14 of the test apparatus had a diameter of 25 mm and the penetrating means 16 was a metal plunger with a fixture holding a 10 microliter ($\mu$L) polypropylene plastic pipette (available from Eppendorf, Germany). The pipette has a tip with an outside diameter of 0.84 mm and a shaft that tapered over a length of 5 mm to a substantially constant diameter of about 2 mm. In Variation B, hole 12 in the center of clamp assembly 14 of the test apparatus had a diameter of 76 mm. The penetrating means 16 was a smooth cylindrical metal probe having a hemispherical tip with a diameter of about 12 mm. The speed of the probe was 508 mm/min. The amount of deflection, i.e., displacement at peak load prior to rupture was measured in inches and converted into millimeters. Each reported value is an average of 5 test measurements.

Dynamic Coefficient of Friction Test

The dynamic coefficient of friction of the surface of the film sample that would first contact a penetrating object was determined by using ASTM D1894-95 with the apparatus described in drawing c, FIG. 1 of the ASTM and the sled as described in Section 5.1 of the ASTM. The sliding surface was a sheet of cast polypropylene film (available as 7C12N from Shell Chemical Co., Beaupre, Ohio). A metal filament wire was used to pull the sled and various weights were placed on the sled to achieve different forces normal to the plane of the sample being tested. The normal force was calculated as the mass of the weight on the sled multiplied by the gravitational acceleration. The steady-state pulling force was determined, after initial transient values, for each normal force and was plotted against the normal force. The dynamic coefficient was the slope of the curve of the plotted data.

Hole Dimension Measurement

To determine this measurement, a punctured hole was viewed with a Boeckeler VIA-170 microscope (Tuscon, Ariz.) using 50× and 200× objective lenses. The dimensions were measured with a Moritex Scopeman (Model MS803, San Diego, Calif.) and the data was converted to an area measurement. Each reported value represents the average of three measurements.

EXAMPLES

Example 1

Example 1 illustrates the effect of the dynamic coefficient of friction of a film on the puncture resistance and resealability of a multilayer film.

Sample A was a three layer film with a thermoplastic elastomer core layer and high density polyethylene (HDPE) outer layers. The outer layers were made of thermoplastic HDPE A (available as PETROTHENE LS3150-00, elongation percent at break of 300, Equistar Chemicals, Houston, Tex.). The outer layer material was conveyed through an extruder having multiple zones with a single screw extruder (diameter of 19 mm, L/D of 32/1, available from Killion, Inc., Cedar Grove, N.J.) The outer layer material extruder operated with zone temperatures increasing from 163° C. to 216° C. The outer layer material was conveyed through a gear pump to the "A" and "C" channels of the three-layer Cloeren feedblock (available from Cloeren Co., Orange, Tex.) that was set at 216° C. The core layer was made from a thermoplastic elastomer (available as KRATON D1107 styrene-isoprene block copolymer, recovering stress (at 300% elongation) of 2.07 MPa (300 psi), from Shell Chemical Co., Beaupre, Ohio) and conveyed through an extruder having multiple zones with a single screw extruder (diameter of 32 mm, L/D of 24/1, available from Killion, Inc.). The core layer material extruder operated with zone temperatures increasing from 188° C. to 216° C. The core layer material was passed to the "B" channel of the Cloeren feedblock. The resulting multilayered flow stream was passed through a single orifice film die (having a width of 254 mm (10 inch) and available from EDI, Chippewa Falls, Wis.) that was set at a temperature of 216° C. The resulting molten film was drop cast onto a chill roll, which was set at a temperature of 11° C., and collected. The line speed was 12.2 m/min., the individual flow rates of the outer layer and core layer were such that each outer layer had a thickness of about 3.1 micrometer ($\mu$m) and the overall film thickness was measured at about 72 $\mu$m.

Sample B was made as Sample A except a layer of Silicone Oil A (available as DC-200 PDMS oil from Dow Corning, Midland, Mich.) was applied on one side of the three layer film.

Sample C was made as Sample A except a layer of Silicone Oil B (available as Part No. 700-01015 PDMS oil from Rheometrics Scientific, Piscataway, N.J.) was applied on one side of the three layer film.

Sample D was made as Sample A except a layer of pressure-sensitive adhesive (an acrylate-based pressure-sensitive adhesive (98/2 isooctyl acrylate/acrylic acid) made according to U.S. Pat. No. 5,804,610, Example 11 (except the ratio of IOA to AA was 98:2 instead of 97:3) having a thickness of approximately 125 $\mu$m was applied on one side of the three layer film by lamination.

Each sample was measured for puncture resistance with Variation A, dynamic coefficient of friction on the surface that first contacted the puncturing means, and resulting hole area. Results are reported in Table 1 or in the discussion following the table.

TABLE 1

| Sample | Surface modifier | Dynamic friction coeff. | Displacement to break mm (in) |
|---|---|---|---|
| A | None | 0.183 | 106 (4.167) |
| B | Silicone Oil A | 0.028 | 18 (0.712) |
| C | Silicone Oil B | 0.051 | 29 (1.153) |
| D | Adhesive | (a) | 304 (11.958) | a: The coefficient of friction could not be measured because the sled did not move before the film broke.

The data in Table 1 indicate that puncture resistance as measured by displacement at break decreased when the frictional properties of the film surface first contacting the puncturing means decreased. Likewise, the puncture resistance increased when the surface friction increased.

For samples A and B, the effective diameters of the hole and the shaft of the puncturing means were also measured and a ratio of areas was calculated. The effective area of the puncturing means, calculated based on the largest diameter of the plastic pipette that entered the hole, was 2.00 mm. The effective diameter of the hole for Sample A and B, converting the area of the often jagged tear in the film into a circle having an equivalent area, was approximately 1.80 mm and 0.25 mm, respectively. The ratio of the effective area of the puncturing means to the effective area of the resulting hole for Samples A and B were calculated to be 0.81 and 0.016, respectively.

Example 2

Example 2 illustrates the effect of the dynamic coefficient of friction of a film on the puncture resistance of a single layer film.

Sample A was made by extruding very low density polyethylene (available as ENGAGE 8200 from Dow Chemical Company, Midland, Mich.) into a film having a thickness of about 75 $\mu$m. The polymer was conveyed with a single screw extruder through the core layer slot of the feedblock and single orifice film die used for Example 1.

Sample B was made as sample A except a layer of Silicone Oil A was applied one side of the single layer film.

Each sample was measured for puncture resistance with Variation A and dynamic coefficient of friction on the surface that first contacted the puncturing means. Results are reported in Table 2.

TABLE 2

| Sample | Surface modifier | Dynamic friction coeff. | Displacement to break mm (in) |
|---|---|---|---|
| A | None | 3.38 | 142 (5.594) |
| B | Silicone Oil A | 0.019 | 10 (0.402) |

The data in Table 2 indicate that puncture resistance decreased when the frictional properties of the film surface first contacting the puncturing means decreased.

Example 3

Example 3 illustrates the effect of stretching and relaxing a film on the puncture resistance of the film.

Sample A was made in a manner similar to Sample A of Example 1 except the three layer film was further consecutively stretched in one direction to 500% of its original length in both the machine and transverse directions. Then the film was allowed to recover until it reached a steady state in approximately 10 minutes.

Sample A and Sample A of Example 1 were measured for puncture resistance with Variation B. Results are reported in Table 3.

TABLE 3

| Sample | Modification | Displacement to break mm (in) |
|---|---|---|
| A | Stretched to 500% & relaxed | 202 (7.943) |
| 1-A | none | 139 (5.453) |

The data in Table 3 indicate that puncture resistance increased when the film was stretched and relaxed before being punctured.

Example 4

Example 4 illustrates the effect of stretching a film on the puncture resistance of the film.

Sample A was made by further stretching Sample A of Example 1 in one direction to 300% of its original length while held in the testing sample holder (and was punctured while it was stretched).

The sample was measured for puncture resistance with Variation A. Results are reported in Table 4 together with that of Sample A of Example 1.

TABLE 4

| Sample | State | Displacement to break mm (in) |
|---|---|---|
| A | Stretched to 300% | 66 (2.579) |
| 1-A | original | 106 (4.167) |

The data in Table 4 indicate that puncture resistance decreased when the film was punctured while it was stretched.

Example 5

Example 5 illustrates how a film can be made less or more puncture resistance depending on which side of a film consisting of two layers of different materials first contacts the puncturing means.

Sample A was made by further applying different materials to each side of Sample A of Example 1. Silicone Oil A was applied to side one of the film in a manner similar to Sample B of Example 1 and adhesive was applied to side two in a manner similar to Sample D of Example 1.

The sample was measured for puncture resistance with Variation A. Results are reported in Table 5 together with that of Sample A of Example 1.

TABLE 5

| Sample | Surface | Displacement to break mm (in) |
|---|---|---|
| A - side 1 | Silicone Oil A | 29 (1.136) |
| 1-A | original | 106 (4.167) |
| A - side 2 | Adhesive | 284 (11.182) |

The data in Table 5 indicate that the film was significantly less puncture resistant when the penetrating means first contacted the side with the silicone oil rather than the side with the adhesive.

Example 6

Example 6 illustrates another way a film can be made less or more puncture resistant depending on which side of a film consisting of two layers of different materials first contacts the puncturing means.

Sample A was made in a manner similar to that of Sample A of Example 1 except the side-2 outer layer material was a metallocene catalyzed very low density polyethylene (VLDPE) available as ENGAGE 8200 from Dow Chemical). The VLDPE was conveyed with a single screw extruder having multiple zones (Killion Model KLB075) that was operating with zone temperatures increasing from 160° C. to 216° C. The material was passed to the C channel of the three-layer feedblock. The line speed was 7.77 m/min. and the overall thickness was measured at 91 µm.

Each side of the sample was measured for puncture resistance with Variation B. Results are reported in Table 6.

TABLE 6

| Sample | Surface | Displacement to break mm (in) |
|---|---|---|
| A - side 1 | HDPE | 203 (7.984) |
| A - side 2 | VLDPE | 327 (12.871) |

The data in Table 6 indicate that this film also had different puncture resistance depending on which outer layer material was first contacted with the penetrating means.

Example 7

Example 7 illustrates the effect of outer layer thickness on puncture resistance.

Sample A–D were made as Sample A of Example 1 except gear pump settings on the outer layer extruder were adjusted to obtain a different outer layer thickness for each sample, as reported in Table 7, while the core layer extruder settings and line speed were unchanged.

The samples as well as Sample A of Example 1 were measured for puncture resistance with Variation B. Results are reported in Table 7.

TABLE 7

| Sample | Gear pump setting rpm | Outer layer thickness µm | Displacement to break mm (in) |
|---|---|---|---|
| 1-A | 7 | 3.1 | 139 (5.453) |
| A | 10 | 3.5 | 122 (4.785) |
| B | 13 | 4.6 | 90 (3.552) |
| C | 18 | 6 | 76 (3.008) |
| D | 23 | 6.4 | 64 (2.510) |

The data in the above table indicate that puncture resistance decreases as outer layer thickness increases for the construction tested.

Example 8

Example 8 illustrates the effect of total film thickness on puncture resistance.

Sample A–C were made as Sample C of Example 7 except line speed settings were adjusted to obtain a different total film thickness for each sample, as reported in Table 8 (both extruder settings were unchanged).

The samples were measured for puncture resistance with Variation B. Results are reported in Table 8 together with that of Sample C of Example 7.

TABLE 8

| Sample | Line speed meters/minute | Total thickness µm | Displacement to break mm (in) |
|---|---|---|---|
| A | 7.6 | 122 | 55 (2.184) |
| B | 9.14 | 94 | 69 (2.730) |
| 7-C | 12.2 | 76 | 76 (3.008) |
| C | 15.2 | 60 | 82 (3.242) |

The data in the above table indicate that puncture resistance decreases as total film thickness increases for the construction tested.

Example 9

Example 9 illustrates the effect of different outer layer materials, each having a different elongation at break, on puncture resistance of a three layer construction.

Sample A was made as Sample A of Example 1 except the outer layer material was HDPE B (available as DOWLEX IP60 HDPE, elongation percent at break of 225, from Dow Chemical); the extruders reached upper temperatures of 232° C., and the die was set at a temperature of 232° C. Also, the line speed and extruder flow rates were changed to result in a total film thickness of 140 μm with outer layer thicknesses of about 10 μm each.

Sample B and Sample C were made as Sample A except the outer layer material was HDPE A (described in Example 1) and HDPE C (ALATHON M5865 HDPE from Equistar, elongation percent at break of 800), respectively.

The samples were measured for puncture resistance with Variation B. Results are reported in Table 9.

TABLE 9

| Sample | Outer layer Material | Elongation percent | Displacement to break mm (in) |
|---|---|---|---|
| A | HDPE B | 225 | 62 (2.422) |
| B | HDPE A | 300 | 72 (2.828) |
| C | HDPE C | 800 | 136 (5.374) |

The data in the above table indicate that as the elongation at break of the outer layer increased, the puncture resistance of the outer layer increased.

Example 10

Example 10 illustrates the effect of outer layer thickness on the puncture resistance and resealability of a multilayer film.

Sample A, B and C were the same as Sample A, B and C of Example 7 except the films were punctured with a plastic pipette having a shaft diameter of 2.0 mm instead of a metal rod having a shaft diameter of 13.7 mm.

The samples were measured for puncture resistance with Variation A and the resulting area of the hole. Results are reported in Table 10.

TABLE 10

| Sample | Outer layer thickness μm | Displacement to break mm (in) | Ratio of hole area to pipette area |
|---|---|---|---|
| A | 3.5 | 44 (1.719) | 0.0070 |
| B | 4.6 | 38 (1.482) | 0.0041 |
| C | 6 | 22 (0.852) | 0.0009 |

As seen in Table 10, the ratio of the hole area to puncturing means area decreased as the film was less puncture resistant.

Example 11

Example 11 illustrates the effect of a different core material with different recovering stress on puncture resistance of an outer layer/core layer/outer layer construction.

Sample A was made as Sample B of Example 9 except the core material was KRATON D1112P, having a recovering stress of 1.45 MPa (210 psi), available from Shell Chemical Company.

The sample was measured for puncture resistance. Results are reported in Table 11 with those of Sample B of Example 9.

TABLE 11

| Sample | Core Material | Recovering stress MPa | Displacement to break mm (in) |
|---|---|---|---|
| 9-B | KRATON D1107 | 2.07 | 72 (2.828) |
| A | KRATON D1112P | 1.45 | 51 (1.999) |

The data in the above table indicate that as the recovering stress of the core material decreases, the puncture resistance of the film decreases. The elongations at break of the core layer materials of Examples 9–B and 11A were substantially the same at 1300% and 1400%, respectively.

The complete disclosures of the patents and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A polymeric film comprising first and second parallel major surfaces wherein the film can be punctured when the film is stretched to a given displacement by a puncturing object applied to the first major surface, but the film cannot be punctured when the film is stretched to the same displacement by the same puncturing object applied to the second major surface, wherein the film comprises at least one elastomeric layer and has a targeted level of resealability.

2. The polymeric film of claim 1, wherein at least one the layer of film comprises a high density polyethylene (HDPE).

3. The polymeric film of claim 1, wherein at least one layer of the film comprises a very low density polyethylene (VLDPE).

4. The polymeric film of claim 1, wherein at least one layer of the film comprises a high density polyethylene (HDPE) and at least one layer of the film comprises a very low density polyethylene (VLDPE).

5. The polymeric film of claim 1, wherein said polymeric film is a multilayer film.

\* \* \* \* \*

UNITED STATES PATENT AND TRADEMARK OFFICE
CERTIFICATE OF CORRECTION

PATENT NO. : 6,869,666 B2
DATED : March 22, 2005
INVENTOR(S) : Deeb, Gerald S.

It is certified that error appears in the above-identified patent and that said Letters Patent is hereby corrected as shown below:

Title page,
Item [56], References Cited, OTHER PUBLICATIONS, "U.S. Appl. No. 09/119,494" reference, after "Therefrom" insert -- Attorney Docket No. 53662USA9A --.

Column 2,
Line 58, delete "0.01 inches" and insert -- 0.010 inches --, therefor.

Signed and Sealed this

Twenty-third Day of August, 2005

JON W. DUDAS
*Director of the United States Patent and Trademark Office*